United States Patent [19]
Owens

[11] Patent Number: 5,172,039
[45] Date of Patent: Dec. 15, 1992

[54] DEVICE UTILIZING CAPACITIVE COUPLING TO PROVIDE AN OUTPUT INDICATIVE OF ANGULAR RELATIONSHIP

[75] Inventor: Alan R. Owens, Longmont, Colo.

[73] Assignee: Staodyn, Inc., Longmont, Colo.

[21] Appl. No.: 760,761

[22] Filed: Sep. 16, 1991

[51] Int. Cl.⁵ ............................................. G08C 19/00
[52] U.S. Cl. ................................. 318/489; 340/870.37; 324/660
[58] Field of Search ................ 318/489, 662; 324/660, 324/688, 666; 361/290, 292; 340/870.37

[56] References Cited

U.S. PATENT DOCUMENTS

| | | | |
|---|---|---|---|
| 3,668,672 | 6/1972 | Parnell | 324/660 |
| 3,729,991 | 5/1973 | Hardway, Jr. | 324/660 X |
| 3,784,897 | 1/1974 | Norrie | 324/660 X |
| 3,961,318 | 6/1976 | Farrand et al. | 318/662 X |
| 4,092,579 | 5/1978 | Weit | 318/662 |
| 4,238,781 | 12/1980 | Vercellotti et al. | 324/61 R |
| 4,755,731 | 7/1988 | Anthony et al. | 318/662 |
| 5,012,237 | 4/1991 | Rosswurm | 324/660 X |

FOREIGN PATENT DOCUMENTS

| | | | |
|---|---|---|---|
| 1-97809 | 8/1989 | Japan | 318/489 |

OTHER PUBLICATIONS

Lion, "Capacitive Transducers", Instruments & Control Systems, Jun. 1966, pp. 157-159.

*Primary Examiner*—A. Jonathan Wysocki
*Attorney, Agent, or Firm*—Robert E. Harris

[57] ABSTRACT

A device utilizing capacitive coupling to provide an output indicative of angular relationship. Relatively rotatable units have paired electrical signal paths on closely adjacent portions to establish capacitive coupling therebetween. A high frequency AC signal is conducted through the electrical signal paths, which paths are preferbaly shielded, with the capacitance of one of the paired electrical signal paths being dependent upon the angular relationship between the closely adjacent portions of the units and with the capacitance of others of the paired electrical signal paths being substantially independent of the angular relationship between the closely adjacent portions of the units. A three unit configuration is utilized for determining angular displacement or torque and torque direction with respect to the two rotatable elements rotatable relative to a stator element, and a two unit configuration, which may be combined with the three unit configuration, is utilized for determining angular position between a rotatable element and a stationary element. The output is coupled, for example, to an electrical power unit to provide power assisted steering of a vehicle.

29 Claims, 7 Drawing Sheets

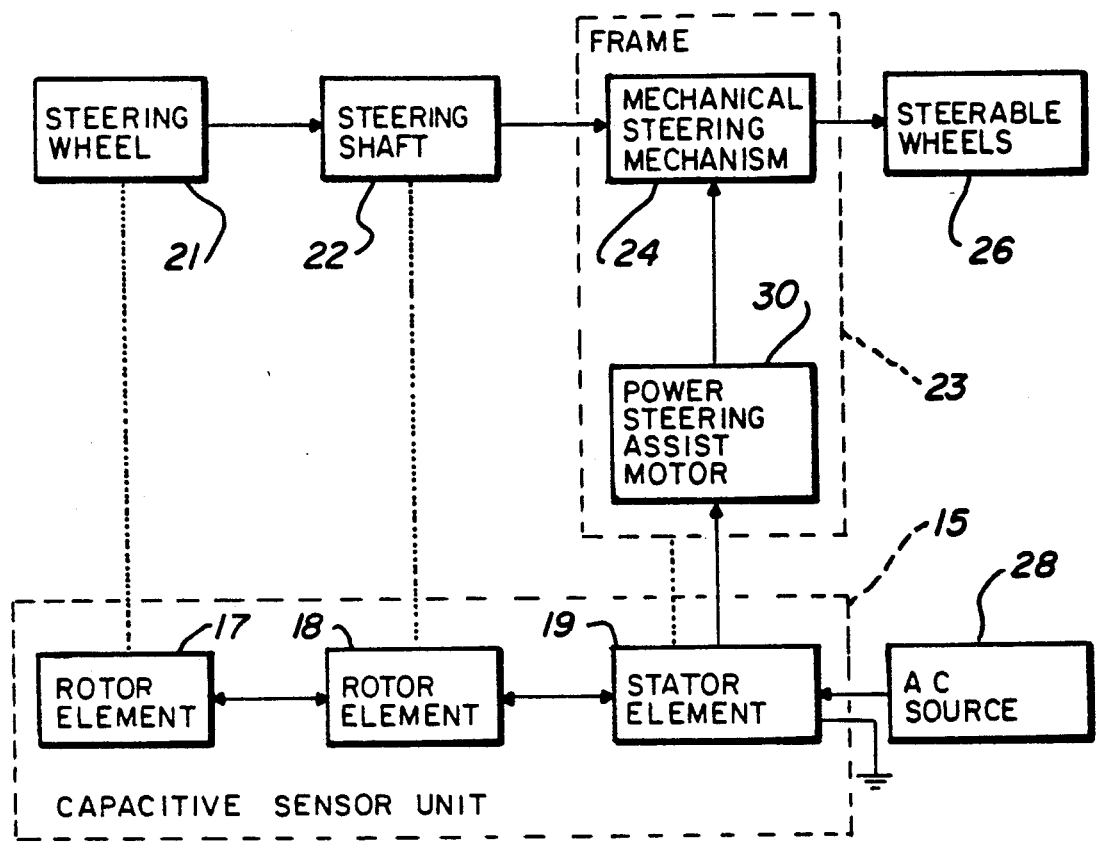
Fig_1
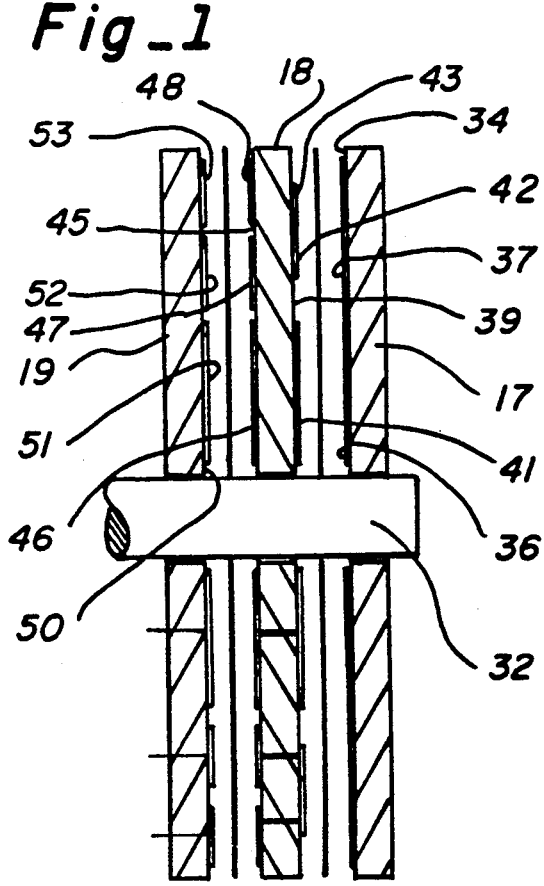
Fig_2

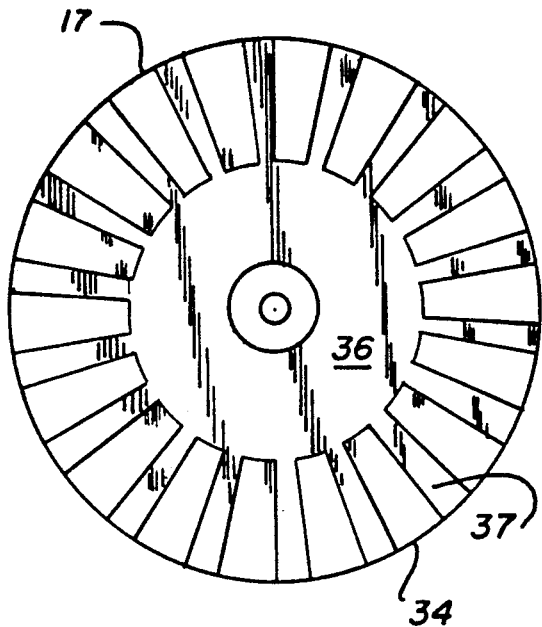
Fig_3A
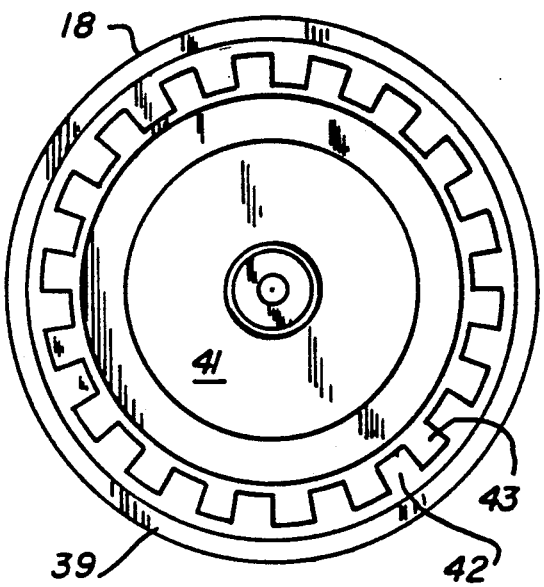
Fig_3B
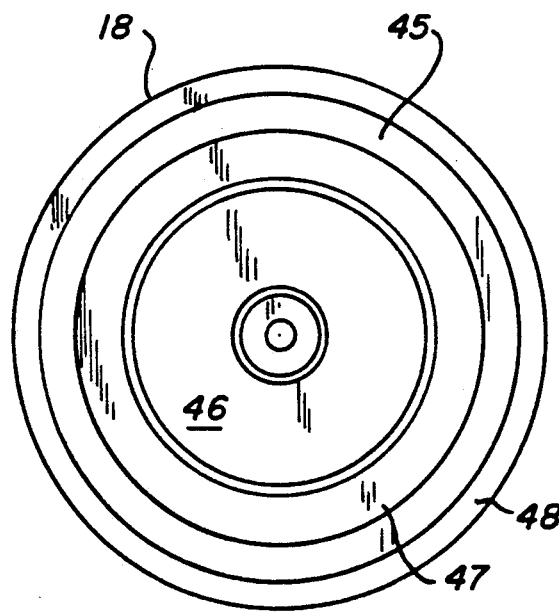
Fig_3C
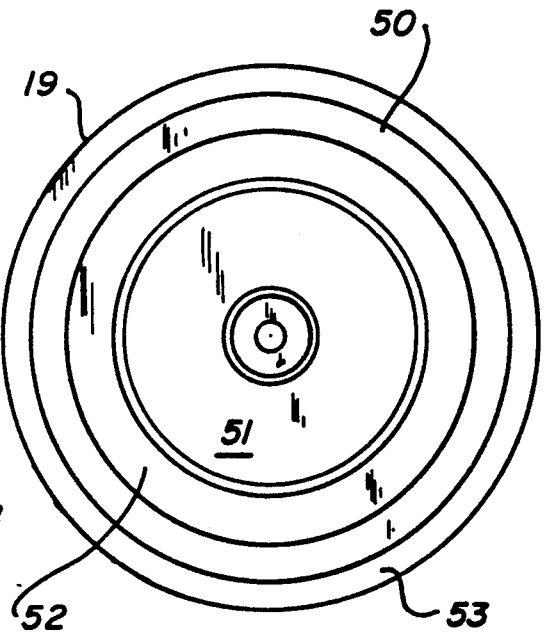
Fig_3D

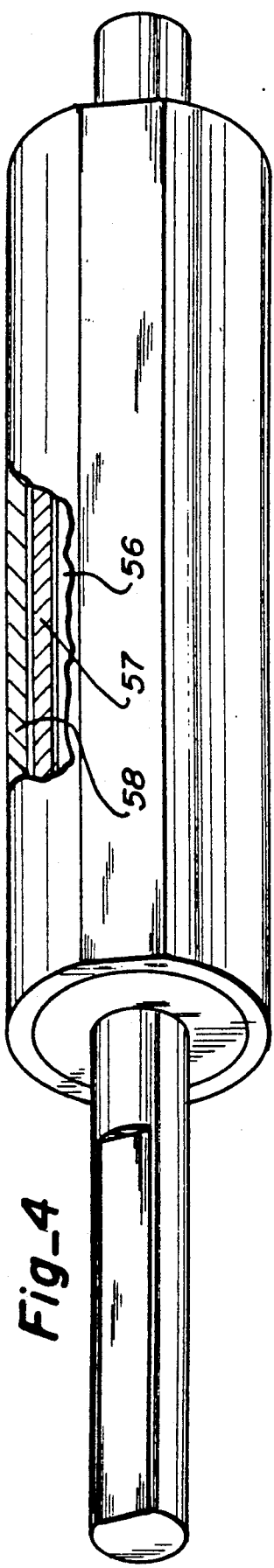
Fig_4
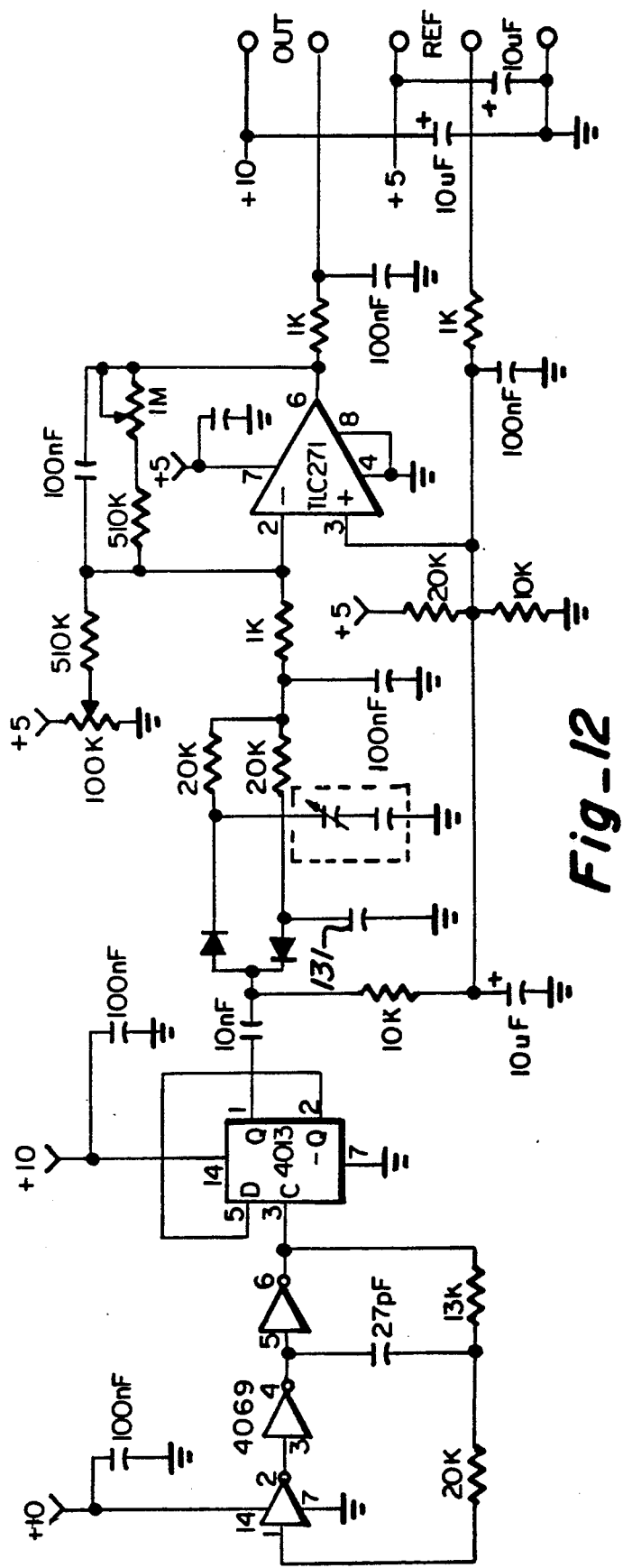
Fig_12

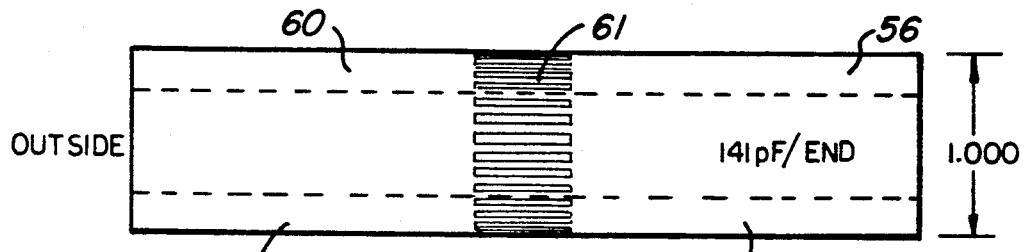
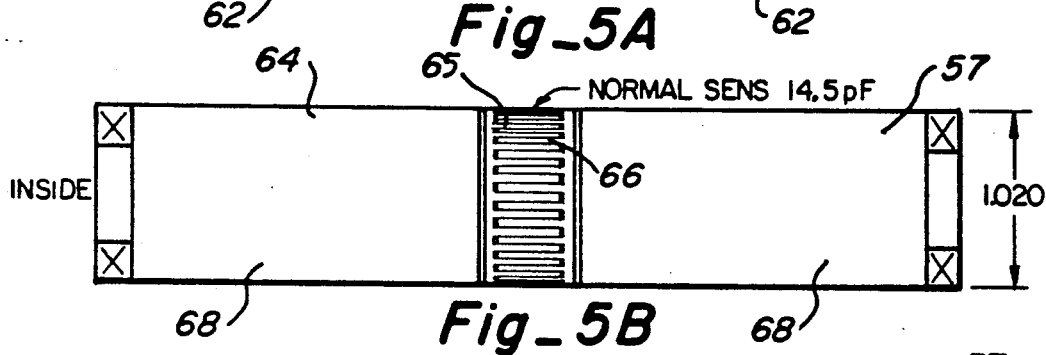
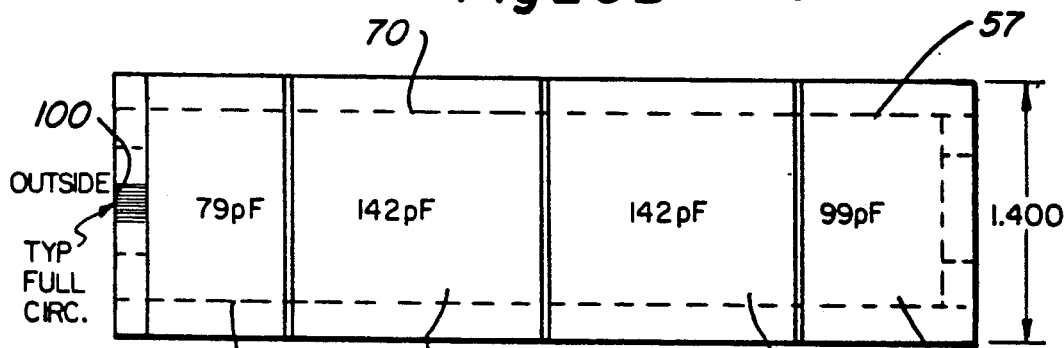
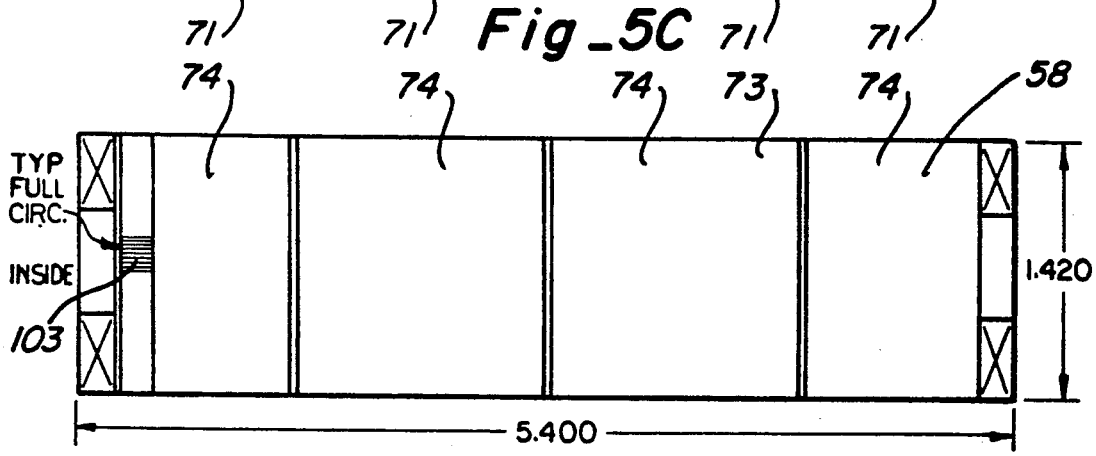

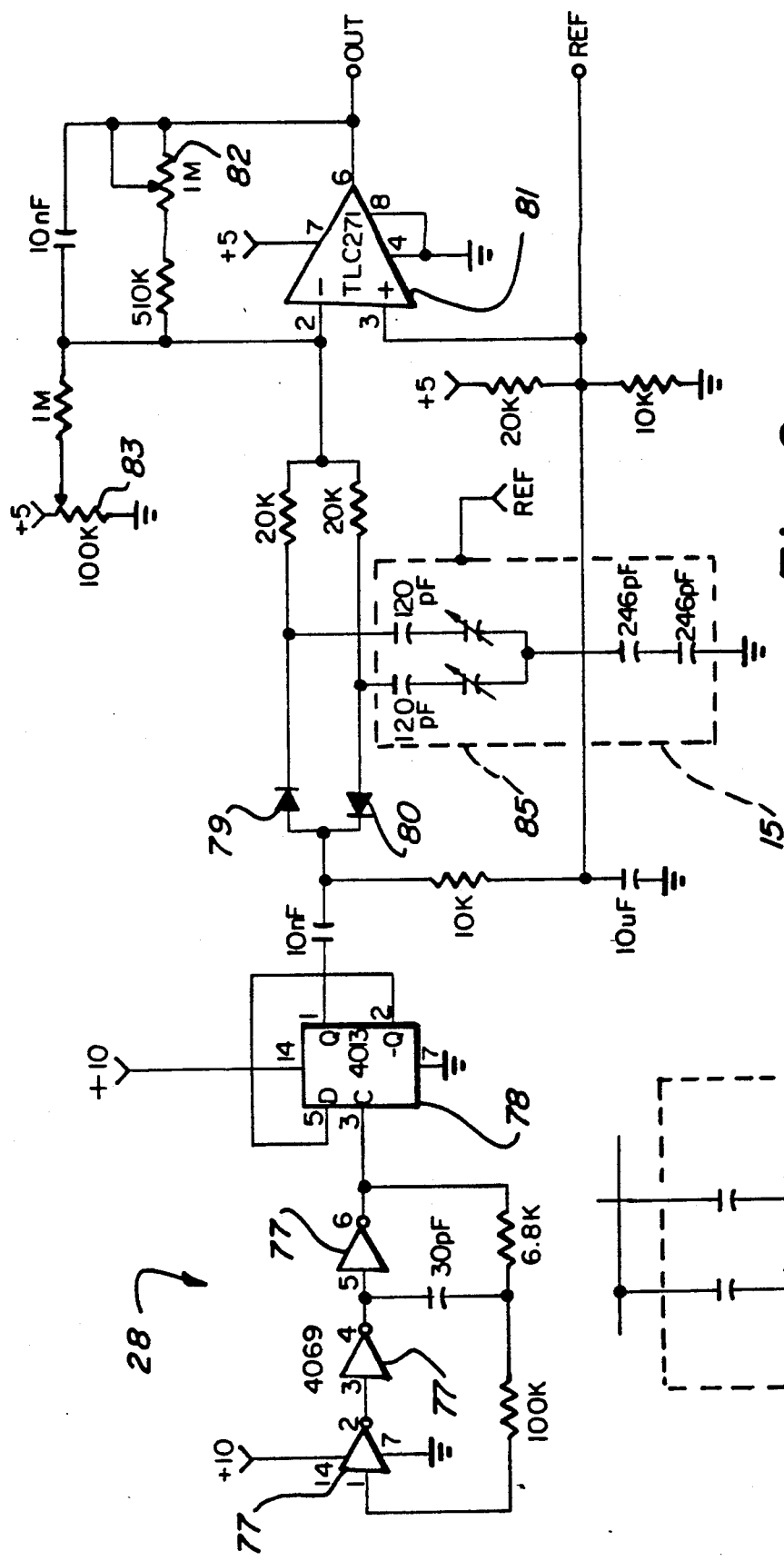
Fig_6
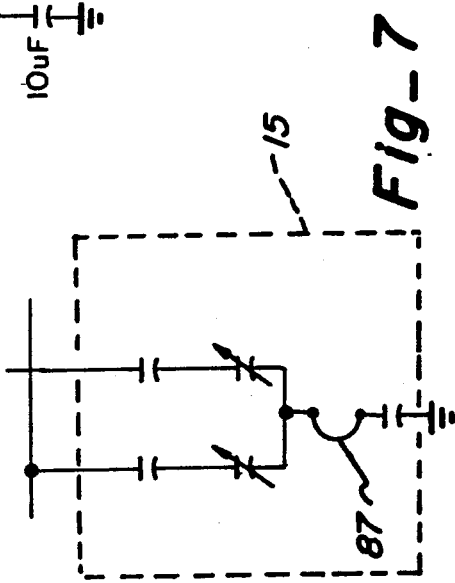
Fig_7

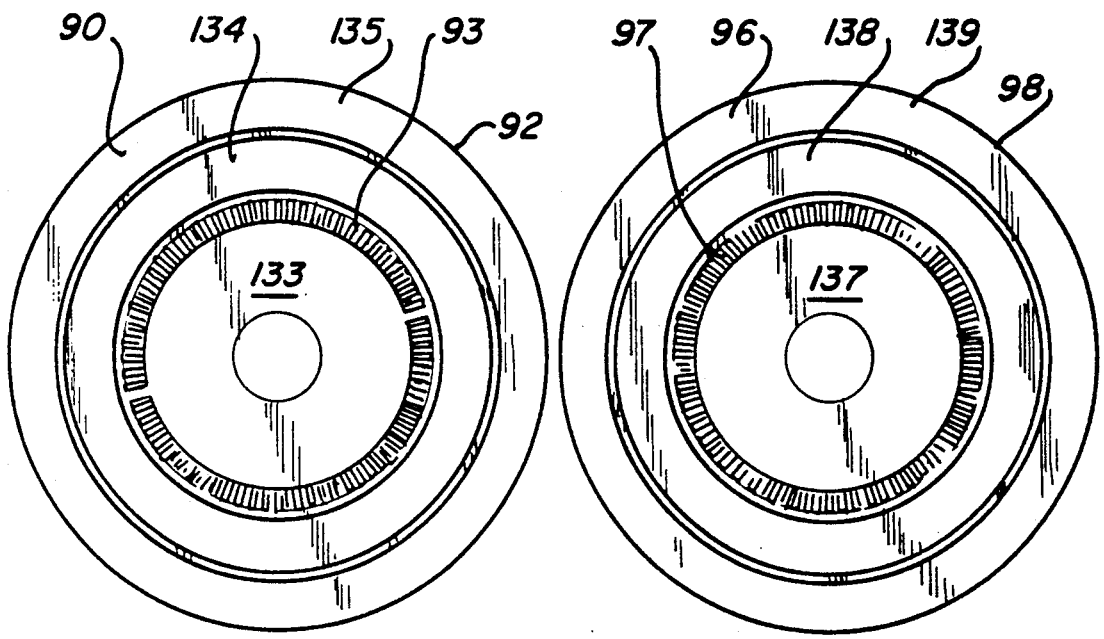
Fig_8A     Fig_8B
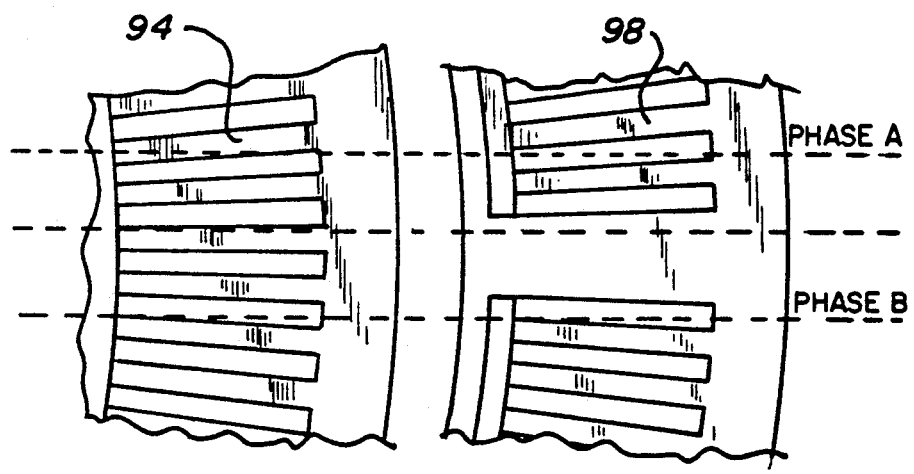
Fig_9

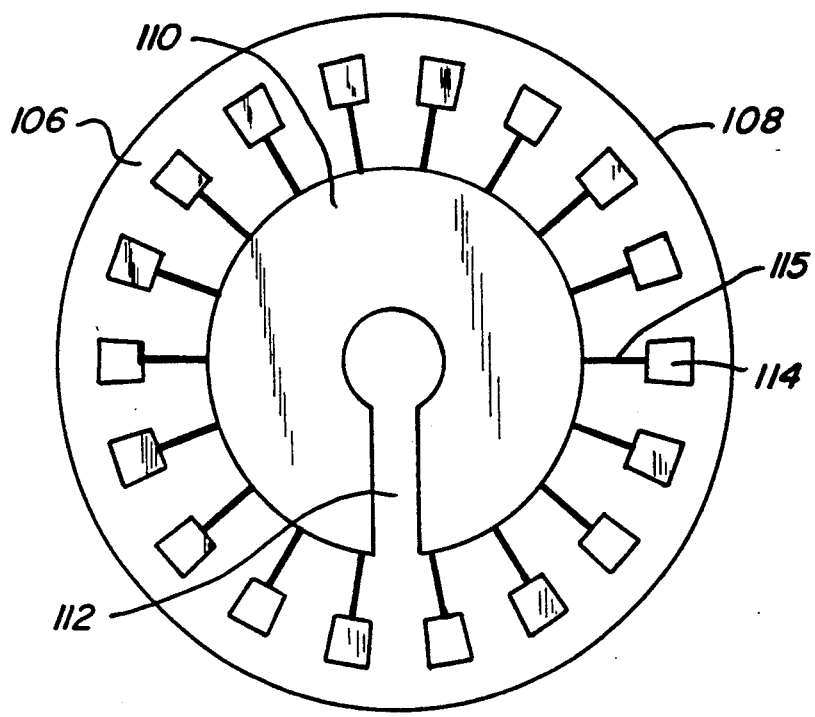
Fig_11A
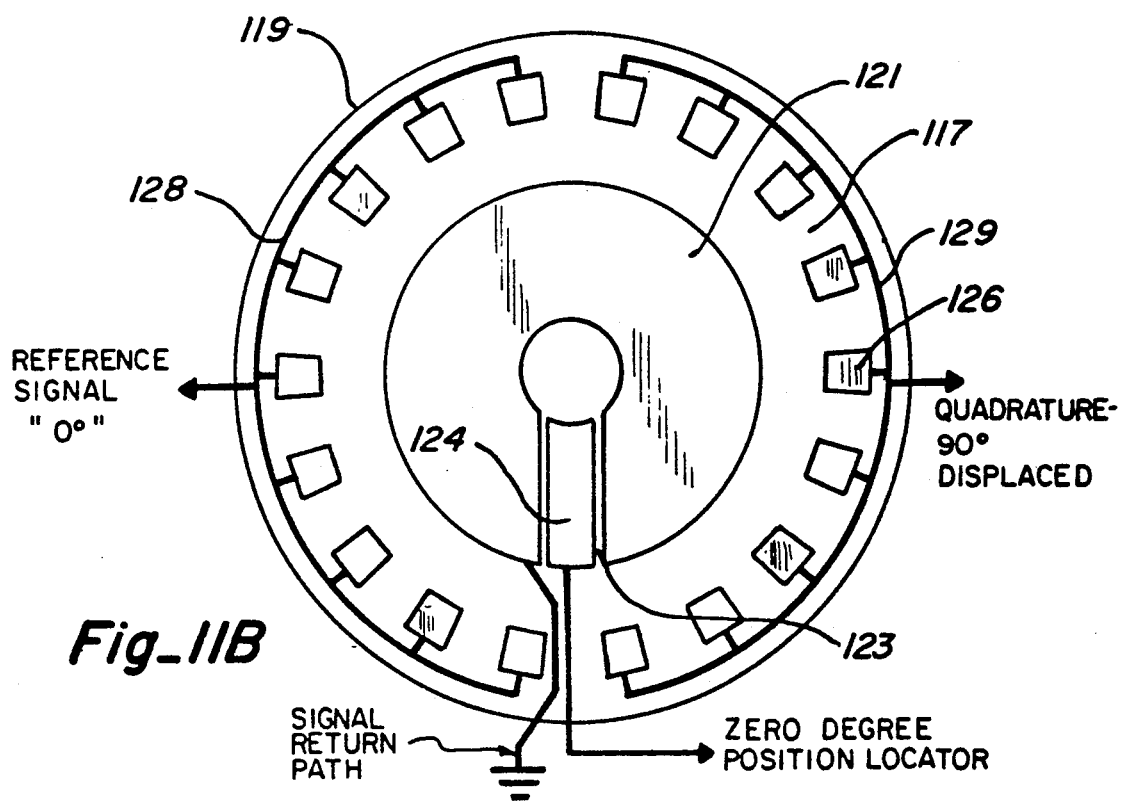
Fig_11B

DEVICE UTILIZING CAPACITIVE COUPLING TO PROVIDE AN OUTPUT INDICATIVE OF ANGULAR RELATIONSHIP

FIELD OF THE INVENTION

This invention relates to a device utilizing capacitive coupling, and, more particularly, relates to a device utilizing capacitive coupling to provide an output indicative of angular relationship between relatively rotatable units.

BACKGROUND OF THE INVENTION

It is oftentimes necessary to sense an angular relationship between two or more units in order to achieve a desired end. Such is the case, for example, where it is necessary to know the angular position of a rotor element relative to a stator element and/or where it is necessary to know the angular displacement between two rotor elements both of which are rotatable with respect to a stator element.

In the case of a motor vehicle such as an automobile, for example, a steering wheel, when rotated, applies a rotative force or torque to a steering shaft, and both the steering wheel and the steering shaft are rotatable with respect to the frame of the vehicle having the steerable (normally front) wheels mounted thereon so that rotation of the steering wheel results in turning of the steerable wheels.

A mechanical arrangement has been, and is, used to cause turning of the steerable wheels in response to rotation of the steering wheel, and a hydraulic system has also been, and is, utilized to cause turning of the steerable wheels with operation of the hydraulic system being initiated in response to rotation of the steering wheel.

Thus, while both mechanical systems and hydraulic systems have been heretofore utilized to control turning of the steerable wheels of a motor vehicle such as an automobile, no system now exists that allows the driver of such a vehicle to more fully control turning of such a vehicle while being assisted in effecting the desired turn by an electrically powered unit.

Power assist has been utilized in other wheeled vehicles, such as, for example, in conjunction with a wheelchair to assist in propelling the wheelchair (see, for example, U.S. Pat. Nos. 4,050,533, 4,125,169 and 4,422,515).

A power assisted wheelchair using capacitive sensing to detect angular displacement between the hand rim and drive wheel is also shown and described in pending U.S. patent application Ser. No. 07/612,824, owned by the assignee of this invention. In the capacitive sensing embodiment shown in pending U.S. patent application Ser. No. 07/612,824, power is provided through mechanical slip rings to a hub mounted unit that includes an oscillator and amplifier and the output is also coupled from the unit through mechanical slip rings.

Various capacitive sensing units are also shown and described in U.S. Pat. No. 3,012,192, including sensing of displacement.

SUMMARY OF THE INVENTION

This invention provides an improved device utilizing capacitive coupling to provide an output indicative of angular relationship between relatively rotatable units.

A plurality of relatively rotatable units have closely adjacent portions with paired electrical signal paths thereon to establish capacitive coupling therebetween. The capacitance of one of the paired electrical paths is dependent upon the angular relationship between the closely adjacent portions of the units while the capacitance of others of the paired electrical signal paths is substantially independent of the angular relationship between the closely adjacent portions of the units.

A high frequency AC signal is conducted through the electrical signal paths, which paths are preferably shielded, and an output is provided that is responsive to the capacitance of the paired electrical signal paths with the output thus provided being indicative of an angular relationship between the closely adjacent portions of the units.

A three unit configuration is particularly useful where a small angular displacement must be sensed between two relatively rotatable elements, both of which can rotate freely in substantial unison with respect to a stator element mounted on a frame, and an output signal indicative of the sensed angular displacement or torque and torque direction is coupled through the stator element to a utilization unit, such as an electric motor, also mounted on the frame, to provide, for example, a power assist based upon the sensed displacement.

A two unit configuration is also useful for determining positioning of a rotor element with respect to a stator element, and such a unit can be combined with a three element configuration.

The device of this invention is thus particularly useful in conjunction with wheeled vehicles to provide a power assist, including, for example, providing power assisted steering of the vehicle.

It is therefore an object of this invention to provide an improved device utilizing capacitive coupling for providing an output indicative of angular relationship.

It is another object of this invention to provide an improved device having a capacitive sensing unit that includes a plurality of elements with paired electrical signal paths on closely adjacent portions to establish capacitive coupling therebetween for detecting angular relationship between the closely adjacent portions of the elements.

It is still another object of this invention to provide an improved capacitive angular displacement sensing device utilizing a three element configuration establishing capacitive coupling between relatively rotatable elements, both of which are rotatable with respect to a stator element mounted on a frame.

It is still another object of this invention to provide an improved capacitive position sensing device utilizing a two element configuration establishing capacitive coupling between relatively rotatable elements.

It is still another object of this invention to provide an improved capacitive sensing device capable of determining angular displacement or torque, torque direction and/or positioning with respect to a pair of relatively rotatable elements both of which are rotatable with respect to a stator element.

It is still another object of this invention to provide an improved capacitive coupling device capable of providing an output suitable for power assist.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a simplified block diagram illustrating the invention incorporated into a wheeled vehicle to provide power assisted steering for the vehicle;

FIG. 2 is a side view illustrating the use of disks to form a three element capacitive sensor unit as shown in block form in FIG. 1;

FIG. 3A, illustrates the inner face of the outer rotor element disk as shown in FIG. 2;

FIG. 3B illustrates the face of the middle (rotor) element disk adjacent to and facing the inner face of the outer rotor element as shown in FIG. 2;

FIG. 3C illustrates the face of the middle (rotor) element disk adjacent to and facing the inner face of the stator element as shown in FIG. 2;

FIGS. 3D illustrates the inner face of the stator element as shown in FIG. 2;

FIG. 4 is a partially cut-away perspective view illustrating the use of three cylinders to form the three element capacitive sensor unit as shown in block form in FIG. 1;

FIG. 5A illustrates the outer surface of the inner rotatable cylinder as shown in FIG. 4;

FIG. 5B illustrates the inner surface of the middle (rotatable) cylinder having the inner cylinder received therein as shown in FIG. 4;

FIG. 5C illustrates the outer surface of the middle (rotatable) cylinder having the inner cylinder received therein as shown in FIG. 4;

FIG. 5D illustrates the inner surface of the nonrotatable outer cylinder having the two rotatable cylinders received therein as shown in FIG. 4;

FIG. 6 is an electrical schematic illustrating use of a three element configuration for the capacitive sensor unit as shown in FIGS. 1 through 5;

FIG. 7 is an electrical schematic of the capacitive sensor unit shown in FIG. 6 and illustrating a direct wire connection between the two rotatable elements;

FIGS. 8A and 8B illustrate, respectively, the adjacent faces of a rotor disk and a stator disk forming a two element position sensor unit usable in this invention;

FIG. 9 is an enlarged partial view illustrating the relationship between the patterns utilized in one of the electrical signal paths on the adjacent faces of the rotor disk and stator disk shown in FIGS. 8A and 8B;

FIG. 10 is an enlarged partial view illustrating the relationships between the patterns utilized in one of the electrical signal paths for position sensing on the adjacent faces of the adjacently positioned rotor element and stator element shown in FIGS. 5C and 5D;

FIGS. 11A and 11B illustrate, respectively, the adjacent faces of a rotor disk and a stator forming a two element position sensor unit having a 0° position locator; and FIG. 12 is an electrical schematic utilized for each of the reference, quadrature and zero degree locator for the position sensor units as shown in FIGS. 8A, 8B 11A and 11B.

DESCRIPTION OF THE INVENTION

The device of this invention is will suited for determining angular displacement or torque between two rotor elements which are rotatable (i.e., angularly displacable) with respect to one another and both of which are rotatable (i.e., angularly displacable) with respect to a stator element, and providing an output indicative thereof to a utilization unit. A specific application of this invention to provide power assisted steering for a motor vehicle is shown in FIG. 1.

As shown in FIG. 1, capacitive sensor unit 15 is configured as a three element unit that includes rotor elements 17 and 18 and stator element 19. As indicated, rotor element 17 is connected with steering wheel 21 of the motor vehicle and constrained to rotation therewith, rotor element 18 is connected with steering shaft 22 of the motor vehicle and constrained to rotation therewith, and stator element 19 is connected with frame 23 of the motor vehicle (and does not rotate with the steering wheel and steering shaft).

As also indicated in FIG. 1, steering shaft 22 is connected with mechanical steering mechanism 24 utilized to control turning of steerable wheels 26 to thereby provide conventional mechanical steering for the vehicle.

As also illustrated in FIG. 1, alternating current (AC) is supplied by AC source 28 to capacitive sensor unit 15 by coupling the AC to stator element 19. As brought out more fully hereinafter, stator element 19 is capacitively coupled with rotor elements 17 and 18, and a return path to ground is provided through the stator element.

In this invention, the angular displacement or torque sensed by rotor elements 17 and 18 of capacitive sensor unit 15 is coupled through stator element 19 to power steering assist motor 30. Power steering assist motor 30 is an electric motor the output shaft of which is connected with mechanical steering mechanism 24 to provide power assist in turning steerable wheels 26. By sensing the torque applied by rotation of the steering wheel by a driver, and then using the sensed torque to energize the power steering assist motor, power assist is provided in turning the wheels in the direction initiated by the driver in rotating the steering wheel in a manner such that the driver is still in control of the turn and has the impression, or feel, of making the turn without requiring the otherwise necessary application of sufficient force to make the turn unaided.

A three element configuration of capacitive angular displacement sensor unit 15 using disks is shown in greater detail in FIGS. 2 and 3A through 3D, while a three element configuration of capacitive sensor unit 15 using cylinders is shown in greater detail in FIGS. 4 and 5A through 5D. It is to be appreciated that the use of disks may be preferable for some applications, while the use of cylinders may be preferable for other applications, and equivalents of either may also be utilized.

As illustrated in FIG. 2, rotor elements 17 and 18 and stator element 19 are positioned closely adjacent to one another, and each element has a plurality of electrical signal paths thereon (the electrical signal paths may be formed, for example, as printed circuit boards). As illustrated in FIG. 2, rotor elements 17 and 18 and stator element 19 may be mounted on shaft 32 so that rotor element 18 is fastened to shaft 32 and constrained to rotation therewith, rotor element 17 is mounted on shaft 32 so that rotor element 17 is rotatable both with respect to shaft 32 and with respect to rotor element 18, and stator element 19 is mounted on shaft 32 but is free to rotate with respect to either rotor element or with respect to shaft 32 (stator element 19 is constrained to movement with frame 23).

As best shown in FIG. 3A, inner face 34 of outer rotor element 17 has two electrical signal paths 36 and 37 thereon, with electrical signal path 36 being ring-shaped and located near the center of face 34, and with electrical signal path 37 being a "flower-petal" design that extends radially outwardly from electrical signal path 36 to near the outer edge of face 34.

As best shown in FIG. 3B, face 39 of middle (rotor) element 18 has three electrical signal paths 41, 42 and 43 thereon, with electrical signal path 41 being ring-shaped (and substantially identical to ring-shaped electrical signal path 36 on face 34 of rotor element 17) and located near the center of face 39 (so as to be aligned with ring-shaped electrical signal path 36 when rotor elements 17 and 18 are mounted on shaft 32). Electrical signal paths 42 and 43 are configured as interdigitized "flower-petals" each segment of which extends radially in opposite directions from one of the thin border portions at each side of the configuration so that, overall, the configuration formed by the alternating segments is a generally ring-shaped path that extends around face 39 near the outer periphery thereof (and is aligned with at least a portion of ring-shaped path 37 on face 34 of the rotor element 17 when rotor elements 17 and 18 are mounted on shaft 32).

As best shown in FIG. 3C, face 45 of middle (rotor) element 18 has three electrical signal paths 46, 47 and 48 thereon, all of which paths are ring-shaped, with electrical signal path 46 being located near the center of face 45 (and has substantially the same dimensions as does electrical signal path 41 on face 39 of rotor element 18), with electrical signal path 47 being outwardly of electrical signal path 46 on face 45, and with electrical signal path 48 being near the outer periphery of face 45.

As indicated in FIG. 2, electrical signal path 41 on face 39 of middle (rotor) element 18 is electrically connected to electrical signal path 46 on face 45 of middle (rotor) unit 18, while electrical signal paths 42 and 43 on face 39 are electrically connected to electrical signal paths 47 and 48 on face 45.

Face 50 of stator element 19 is closely adjacent to face 45 of middle rotor element 18 when stator element 19 and middle (rotor) element 18 are mounted on shaft 32. As best shown in FIG. 3D, face 50 has three ring-shaped electrical signal paths 51, 52 and 53 thereon substantially identical to electrical signal paths 46, 47 and 48 on face 45 of middle (rotor) element 18 (and are aligned therewith when stator element 19 and middle (rotor) element 18 are mounted on shaft 32).

When rotor elements 17 and 18 and stator element 19 are mounted on shaft 32, as indicated in FIG. 2, electrical signal paths 51, 52 and 53 on face 50 of stator element 19 couple capacitively to faces 46, 47 and 48, respectively, on face 45 of middle (rotor) element 18. Since the ring-shaped electrical signal paths on face 50 of stator element 19 are substantially identical to the corresponding ring-shaped electrical signal paths on face 45 of rotor element 18, the capacitance between the paired paths (i.e., the aligned paths on the two faces) remains approximately constant (i.e., does not change or vary significantly as rotor element 18 rotates with respect to stator element 19).

In like manner, electrical signal path 36 on face 34 of outer rotor element 17 couples capacitively to electrical signal path 41 on face 39 of middle (rotor) element 18. Since the ring-shaped electrical signal paths are also substantially identical, the capacitance between the paired paths does not change or vary significantly as rotor elements 17 and 18 are rotated with respect to one another.

While air is the preferred dielectric between the faces of the three rotor element disks, it is to be appreciated that other dielectrics such as, for example, a tough plastic (such as Teflon), could be utilized in the space between the faces.

By providing substantially identical paired electrical signal paths as brought out above, the paired paths function as slip-rings (in a manner similar to that of mechanical slip rings) when transferring sufficiently high frequency AC signals (about 1 Mhz being now preferred, although a frequency as low as about 336 KHZ has also been utilized to maintain the impedance across the capacitance formed between the paired paths relatively low) to and from each of the three elements of the capacitive sensor unit.

Angle sensing is accomplished between rotor elements 17 and 18 by means of electrical signal path 37 on face 34 of outer rotor element 17 and electrical signal paths 42 and 43 on face 39 of middle (rotor) element 18. Electrical signal paths 37, 42 and 43 have a series of segments forming a "flower-petal" configuration, so that as one of the rotor elements is angularly displaced with respect to the other rotor element, the segments of the paired electrical signal paths are brought toward and away from alignment with one another (which changes the spacing between the electrical signal paths) and this varies the mutual capacitance established between the paired paths with the magnitude of the capacitance being dependent upon the amount of angular displacement between the rotor elements.

In this invention, even slight angular displacement between the two rotor elements (one or two degrees) can be sensed. By utilization of two electrical signal paths having interdigitized segments (i.e., paths 42 and 43 on face 39 of middle (rotor) element 18), the capacitance established between path 37 on face 34 of outer rotor element 17 and path 42 on face 39 of middle (rotor) element 18 rises as the capacitance established between path 37 on face 34 and path 43 on face 39 falls, and vice versa. In this manner, angular displacement or torque can be better sensed.

The angular displacement or torque can be sensed so long as the rotor elements are not angularly displaced more than one-half of the width of a segment of the electrical signal paths (within this angular displacement, torque is directly proportional to the change in capacitive impedance sensed by the paired electrical signal paths). Since sensitivity to angular change is proportional to the number of segments and the angular width of the segments of electrical signal paths, sensitivity is increased by making the segments smaller in width and more numerous, while larger angular displacements can be measured by making the segments larger in width and less numerous.

Capacitive sensor unit 15 may be configured in a manner other than with disks, and in at least some cases, it may be desirable to do so. The electrical signal path may be, for example, deposited or formed on other surfaces such as conical or cylindrical surfaces, or possibly on more complex structures forming multiple parallel plate capacitors.

As shown in FIGS. 4 and 5A through 5D, capacitive sensor unit 15 may be formed on three cylinders 56, 57, and 58 to provide power assisted steering. As best shown in FIG. 4, the three cylinders are coaxially positioned so that the portions of the cylinders having the electrical signal paths thereon are closely adjacent to one another when in operating position. Cylinders 56 and 57 are rotatable elements, while cylinder 58 is non-rotatable (cylinders 56 and 57 are also angularly displacable with respect to one another).

As best shown in FIG. 5A, inner cylinder 56 (which may be, for example, part of a rotatable steering shaft) has an outer surface 60 with segmented electrical signal path 61 thereon. As shown, electrical signal path 62 extends in both longitudinal directions from electrical signal path 61. As also shown, signal path 61 consists of a plurality of longitudinally extending segments with the segments entirely surrounding the outer cylindrical surface at the center portion thereof.

Cylinder 57 (which may be, for example, a part of a steering wheel assembly) has an inner surface 64 with electrical signal paths 65 and 66 thereon. As shown, paths 65 and 66 include segments with the segments of the paths being interdigitized. The segments of electrical signal paths 65 and 66 extend entirely around the center portion of the cylindrical surfaces and are positioned closely adjacent to segmented electrical signal path 61 on the outer surface 60 of cylinder 56 when the cylinders are positioned coaxial to one another (as shown in FIG. 4). By this arrangement, the electrical signal paths and capacitive coupling established between the electrical signal paths are comparable to and function like electrical signal paths 37 and 42-43 of rotor elements 17 and 18 as described above.

In addition, ring-shaped electrical signal paths 68 are positioned longitudinally outwardly from both sides of electrical signal paths 65 and 66 (as also shown in FIG. 5B), and these electrical signal paths are aligned with electrical of signal paths 62 on cylindrical surface 60 of cylinder 56 when the cylinders are aligned (as indicated in FIG. 4). Since electrical signal paths 62 and 68 are substantially identical, the capacitance will remain constant as the cylinders rotate with respect to one another, and hence, this structure operates in essentially the same manner as does paired electrical signal paths 36 and 41 of rotor elements 17 and 18 above described.

As shown in FIG. 5C, outer surface 70 of cylinder 57 has a series of cylindrical portion 71 thereon forming three electrical signal paths (the two outer cylindrical portions may be combined as a single electrical signal path). Although not shown, it is to be realized that these electrical signal paths are connected with the electrical signal paths on the inner side of the cylinder (as shown in FIG. 5B) in the same manner as described above in connection with middle (rotor) element 18.

As shown in FIG. 5D, cylinder 58 (which may be part of the frame of the vehicle) has an inner surface 73 with a series of cylindrical portions 74 thereon forming three electrical signal paths substantially identical to electrical signal paths 71 on outer surface 70 of cylinder 57. Electrical signal paths 74 are aligned with the corresponding electrical signal paths 71 when the cylinders are coaxially positioned with respect to one another (as indicated in FIG. 4). When so aligned, the resulting paired electrical signal paths operate in essentially the same manner as do the paired electrical signal paths established between the middle (rotor) element 18 and stator element 19 as described above.

An electrical schematic diagram for powering the three element capacitive sensor unit and coupling output signals therefrom is shown in FIG. 6. AC source 28 is shown as a square wave oscillator that includes three inverters 77, one of which is connected with the reference voltage (+10 volts). The output from the last of the three inverters 77 is coupled to flip/flop (F/F) 78 which assures a square wave output to the capacitive sensor unit (symmetry is needed so that one polarity is not biased more heavily than the other, which would result in permanent error offset that would need correction). The Q output from F/F 78 is connected through diodes 79 and 80 to capacitive sensor unit 15.

The capacitance between the paired electrical signal paths on stator element 19 and middle (rotor) element 18 is indicated as a fixed capacitance in FIG. 6, as is the capacitance between the paired electrical signal paths established by the ring-shaped portions of rotor elements 17 and 18, while the capacitance between the paired electrical signal paths that include segments is indicated as variable capacitance in FIG. 6.

The output from capacitive sensor unit 15 is coupled to the negative input of operational amplifier 81 (having a gain potentiometer 82 and a trim potentiometer 83 connected therewith). The positive input of operational amplifier 81 is connected with the reference voltage, and the output is coupled to power steering assist motor 30 (as indicated in FIG. 1).

As also indicated in FIG. 6, it has been found that shielding of the capacitive sensor unit 15 by means of shield 85 improves performance, particularly in a noisy environment. It has also been found that connecting shield 85 to the reference voltage further improves performance.

Although not now preferred for sensing the direction of torque, a change in impedance due to relative motion between the rotor elements could be sensed. However, to do so, alignment of the rotor elements is critical to assuring reliable sensing of capacitive change that is arbitrarily divided into clockwise and counter-clockwise torque.

Sensing the direction of angular displacement or torque may also be accomplished (and is now preferred) by stabilizing and calibrating the resting point of the device using two capacitive signal paths (which is accomplished by connecting the segmented electrical signal path on rotor element 17 back to ground through the paired electrical signal paths offering constant capacitance, as is indicated in FIG. 6). As indicated, there are two capacitive circuit paths for the AC current to ground through the sensor circuit. The interdigitized segmented electrical signal paths on rotor element 18 are coupled with the stator element and the driving signals through one path, while the segmented electrical signal path on rotor element 17 are coupled back to ground through a second path (to balance the capacitance, the paired electrical signal paths coupling the segmented electrical signal path on rotor element 17 back to ground has about twice the area of the paired electrical signal paths coupling the segmented electrical signal paths on rotor 18 back to ground, as is indicated in FIG. 3A through 3D).

The dual path system described above is easier to calibrate because such a system is designed to be stable about a reference voltage which defines the resting (no torque) voltage of the capacitive sensor unit. A relatively high frequency square wave (preferably about 1 Mhz, although a frequency as low as about 336 KHZ has also been utilized) is used to drive the capacitive sensor unit with about 50 pf of each capacitance path being a significant conductive path to ground. The input square wave is referenced to the reference voltage so that the input to the system is centered on the zero angle reference level. The square wave is rectified by diodes 79 and 80 into negative and positive components, and the rectified components are added back together at the input of the operational amplifier.

The two capacitive sensors each load one of the two polarized components and attenuate the component. If the amount of capacitance of each path is equal, then the two polarized components will be attenuated equally and the input signals to the operational amplifier will cancel out to zero. If the zero angle signal is not exactly zero, the operational amplifier output may be trimmed to equal the reference voltage by means of potentiometer 83. The gain adjustment is accomplished using potentiometer 82.

As the capacitance of one path increases, it decreases the amount of that polarity component added to the operational amplifier input. Because of the interdigitized segments of the electrical signal paths on rotor element 18, when the capacitance of one leg increases, the capacitance of the other leg decreases. This makes the capacitance twice as large as it would be with a one-legged system. This capacitance makes a large deflection for any angular displacement of rotor shaft 17 relative to rotor element 18. Moreover, the direction of rotation is clearly established with respect to the resting point. If the deflection is positive, it signifies one direction, and, if negative, it signifies the other direction.

When the maximum angular deflection of one rotor element relative to the other rotor element is small, it is also possible to replace the non-segmented paired electrical signal paths on the rotor elements with a direct coupling, and this can be accomplished by use of a flexible wire 87 connected between the rotor elements, as is indicated in FIG. 7. With only small angular displacement between the rotor elements, such a wire can be flexed repeatedly without undue risk of metal fatigue.

When utilizing the capacitive sensor unit of this invention with rotor 18 connected with the wheel of a vehicle, for example, it is necessary that a position sensor (i.e. a position encoder) be utilized to sense the angle and direction of motion of the wheel. While this may be accomplished using optical encoding, it may also be accomplished using a two element capacitive position sensor unit, as shown in FIGS. 8A, 8B, 9, 11A and 11B utilizing disks as the rotor and stator elements, and in FIGS. 5C, 5D and 10 utilizing cylinders as the rotor and stator elements.

The purpose of such a position encoder unit is to measure the position of a freely turning wheel. In the case of power assisted steering of a vehicle, the angular position of the steering wheel is important, while for other applications, parameters such as velocity, acceleration and direction of rotation of the wheel are important. By analyzing the pulse outputs, it is possible to process the pulse data through integration and/or differentiation to determine the needed information (i.e., angular position or velocity, acceleration and direction of rotation).

With respect to implementation of the position sensor (encoder) unit using disks, as shown in FIGS. 8A, 8B and 9, face 90 of rotor element 92 (shown in FIG. 8A), includes a ring-shaped segmented portion 93 forming an electrical signal path (the segments 94 of which are shown in greater detail in FIG. 9), while face 96 of stator element 98 (shown in FIG. 8B) includes a ring-shaped segmented portion 97 forming an electrical signal path (the segments 98 of which are shown in greater detail in FIG. 9). The rotor and stator elements are positioned for operation with the electrical signal paths 93 and 97 are aligned and closely adjacent to one another.

With respect to implementation of the position sensor (encoding) unit using cylinders, as shown in FIGS. 5C, 5D and 10, the outer surface 70 of cylinder 57 has a ring-shaped segmented portion 100 (at the outer end of the cylinder) forming an electrical signal path (the segments 101 of which are shown in FIG. 10), while the inner surface 73 of cylinder 58 has a ring-shaped segmented portion 103 (at the outer end of the cylinder) forming an electrical signal path (the segments 104 of which are also shown in FIG. 10). Cylinders 57 and 58 are coaxial with respect to one another so that the electrical signal paths 100 and 103 are aligned and closely adjacent to one another.

FIGS. 11A and 11B illustrate a position sensing (encoder) unit with a zero degree position locator (such a locator is needed for power steering assist, for example). As shown in FIG. 11A, face 106 of rotor element 108 includes a ring-shaped central portion 110 forming an electrical signal path having a radially extending slot 112 therein (slot 112 serves as a zero degree position locator). In addition, a series of electrical pads 114 are spaced about the periphery of face 106 (and, overall, are formed into a ring shape at the outer portion of face 106), with each electrical pad being electrically connected to central portion 110 by means of lead 115.

Face 117 of stator element 119, shown in FIG. 11B, includes a ring-shaped central portion 121 forming an electrical signal path (at least substantially identical to that of central portion 110 on face 106 of rotor element 108) having a radially extending slot 123 therein, with slot 123 receiving a zero degree position locator bar 124 thereat. In addition, a series of electrical pads 126 are spaced about the periphery of face 117 (and overall, are formed into a ring shape at the outer portion of face 117, which ring is aligned with the electrical pads that are formed into ring shape by electrical pads 114 on face 106 of rotor element 108), with the electrical pads on one half of face 117 being connected to lead 128 which provides a reference (zero degrees) signal output, and with the electrical pads on the other one-half of face 117 being connected to lead 129 which provides a quadrature (90° displaced) signal output. As also shown in FIG. 11B, central portion 121 is connected through a signal return path to ground and bar 124 is connected to provide a zero degree position locator output signal.

The position encoders above described provide three output signals, as does a typical optical encoder. Velocity and direction are derived from the standard reference pulse train and the quadrature (i.e., 90° shifted from the standard) pulse train.

In the position encoder units shown in FIGS. 11A and 11B (utilizing disks), the electrical pads act as a "flower-petal" arrangement in much the same manner as described above with respect to the segmented electrical signal paths included in capacitive sensor unit 15. As indicated in FIG. 11B, nine electrical pads work in parallel to generate each of the two pulse trains (the number of electrical pads can, of course, be varied). The two groups of electrical pads on face 117 of stator element 119 encounter (i.e., are brought into alignment with) the evenly spaced electrical pads on face 106 of rotor element 108 at different times producing a 90° phase shift. Direction of rotation is determined by which channel produces the first pulses. The signal path returns to ground via the central portion of the rotor elements which provide capacitive coupling (and thus act as slip-rings). Since the central portion of each rotor has far more capacitance than does the relatively small electrical pads, the varying voltage drops across the reference and quadrature electrical pads are dominant.

For power assisted steering, a third signal pulse is added to indicate the "straight ahead" position of the wheels. This is generated by the slots 112 and 123 (having bar 124 therein). Because the zero degree signal should be specific, the electrical pad segments should be narrowly centered at zero degrees. Therefore, the slots 112 and 123 and bar 124 have been made larger in area than are electrical pads 114 and 126. The slot in each central portion of the rotor element 108 and stator element 119 causes the coupled signal to disappear at zero degrees. In this way, the rotor and stator elements can be shared with the capacitive slip-ring function offered by use of the central portions of the elements.

An electrical schematic for the position encoder unit is shown in FIG. 12. Separate detectors are utilized to detect each pulse train (reference and quadrature) and for the zero degree position locator. As shown, the circuitry is comparable to that shown in FIG. 6 15, except that instead of having two variable capacitors in the capacitive sensor unit (as is shown in capacitive sensor unit 15 FIG. 6), there is only one variable capacitor for each pulse train generator. Therefore, the other side of the bridge is formed by a fixed reference capacitor (indicated by the numeral 131 in FIG. 12). The operational amplifier and filter convert and rectify the high frequency signal into discrete, low frequency pulses that correspond to the alignment of the electrical pulses (as each of the electrical pulses are in alignment, one low frequency pulse is generated).

Since the capacitive sensing unit and the position encoder can share the same high frequency signal generator, the position encoder can be included on the same set of elements making up the capacitive sensor unit, as indicated in FIGS. 8A and 8B (with disks used as the rotor and stator elements) and in FIGS. 5C and 5D (with cylinders used as the rotor and stator elements). As shown in FIG. 8A, three electrical signal paths 133, 134 and 135 are provided on the rotor element and, as shown in FIG. 8B, three electrical signal paths 137, 138 and 139 are provided on the stator element to provide capacitive coupling in the same manner as described above with respect to rotor element 18 and stator element 19. In like manner, electrical signal paths 71 and 74 and cylinders 57 and 58, as shown in FIGS. 5C and 5D, provide capacitive coupling for capacitive sensor unit 15.

While not preferred, it is also to be realized that AC coupling could be accomplished, at least in some instances, using inductive coupling.

As can be appreciated from the foregoing, this invention provides an improved device utilizing AC coupling to provide an output indicative of angular relationship, with the improved device being particularly useful for providing power assist.

What is claimed is:

1. A device utilizing AC coupling to indicate angular relationship, said device comprising:
    a first unit having a portion with electrical signal path establishing means thereon;
    second and third units each of which has a portion with an electrical signal path thereon, said portions of said second and third units being positioned closely adjacent and angularly displaceable with respect to one another to establish AC coupling between said electrical signal paths thereon with the magnitude of said coupled AC being dependent upon the angular relationship between said portions of said second and third units, said portions of said second and third units also being electrically connected with one another through at least one additional electrical signal path established by one of direct and AC coupling, and said second unit also having a second portion with electrical signal path establishing means thereon with said second portion of said second unit and said portion of said first unit being positioned closely adjacent to and angularly displaceable with respect to one another to establish AC coupling between said electrical signal path establishing means thereon;
    generating means having an output connected with said electrical signal path establishing means on said portion of said first unit for providing an AC signal therethrough to said electrical signal paths on said portions of said second and third units; and
    output means connected with said electrical signal path establishing means on said portion of said first unit for receiving an output therethrough from said electrical signal paths on said portions of said second and third units and responsive thereto providing an output from said units that is indicative of said angular relationship between said portions of said second and third units.

2. The device of claim 1 wherein said closely adjacent electrical signal paths on said portions of said second and third units include segments configured with respect to one another such that said segments cause the magnitude of said coupled AC established by said AC coupling between said closely adjacent electrical signal paths to be varied as said portions are angularly displaced with respect to one another whereby said output means provides an output that is indicative of at least one of angular displacement, torque and relative positioning between said portions of said units.

3. The device of claim 1 wherein said additional electrical signal path is established by AC coupling and includes a second electrical signal path on each of said portions of said second and third units with said second electrical signal paths being closely adjacent to one another to establish AC coupling therebetween the magnitude of which is substantially independent of the angular relationship between said portions of said second and third units.

4. The device of claim 1 wherein said third unit is manually rotatable, and said second unit is one of non-rotatable and rotatable with said first unit.

5. The device of claim 4 wherein said third unit includes a steering wheel and said second unit is a rotatable steering shaft.

6. The device of claim 1 wherein said AC coupling established between said electrical signal paths is capacitive coupling.

7. The device of claim 6 wherein said portions are one of disks and cylinders.

8. The device of claim 1 wherein said generating means provides an AC output at a sufficiently high frequency to maintain low impedance through said AC coupling established between said electrical signal paths on said portions of said units.

9. The device of claim 8 wherein said high frequency is between about 336 KHZ and 1 Mhz.

10. The device of claim 1 wherein said electrical signal path establishing means on said portion of said first unit and on said second portion of said second unit provide first and second electrical signal paths with said first electrical signal path on said portion of said first unit being connected with said output of said generating means and with said second electrical signal path on said portion of said first unit being connected with said output means.

11. The device of claim 1 wherein said device includes shielding means for shielding said units.

12. The device of claim 11 wherein said shielding means is electrically connected to a reference voltage.

13. The device of claim 1 wherein said device also includes position encoding means.

14. A device utilizing capacitive coupling to indicate angular relationship, said device comprising:
a stator unit having a portion with electrical signal path establishing means thereon;
first and second rotor units each of which has a portion with a plurality of electrical signal paths thereon, said portions of said rotor units being closely adjacent and angularly displaceable with respect to one another with different ones of said electrical signal paths on said portion of one of said rotor units being adjacent to different ones of said electrical signal paths on said portion of the other of said rotor units to establish a plurality of paired paths having capacitive coupling between said adjacent ones of said electrical signal paths with at least one of said paired paths having a capacitance therebetween that is dependent upon the angular relationship between said portions of said units, and said first rotor unit also having a second portion with electrical signal path establishing means thereon with said second portion of said first rotor unit and said portion of said stator unit being positioned closely adjacent to and angularly displaceable with respect to one another to establish capacitive coupling between said electrical signal path establishing means thereon;
generating means having an output connected with said stator unit for providing an AC signal to said units so that said AC signal is conducted through said plurality of electrical signal paths on said units; and
output means connected with said stator unit for providing an output signal from said units that is indicative of said angular relationship between said portions of said rotor units.

15. The device of claim 14 wherein said plurality of paired paths providing said capacitance dependent upon the angular relationship between said portions of said rotor units includes segments on one of said electrical signal paths that varies in spacing with respect to segments on the other of said electrical signal paths dependent upon the angular relationship between said portions, and wherein another of said plurality of paired paths includes segments on said electrical signal paths that do not vary substantially in capacitance regardless of the angular relationship between said portions.

16. A device utilizing capacitive coupling to indicate preselected relationships between units having closely adjacent portions that are angularly displaceable with respect to one another, said device comprising:
a first unit having a first portion with first and second electrical signal paths thereon;
a second unit having second and third portions thereon with said second portion having third and fourth electrical signal paths thereon and said third portion having fifth and sixth electrical signal paths thereon;
a third unit having a fourth portion with seventh and eighth electrical signal paths thereon;
signal generating means for providing AC output signals to said second and third units through said first electrical signal path of said first unit with said AC output signals being conducted through said electrical signal paths on said portions of said second and third units;
mounting means for mounting said units so that said first and second portions of said first and second units are angularly displaceable with respect to one another and so that said third and fourth portions of said second and third units are angularly displaceable with respect to one another, with said first and third electrical signal paths and said second and fourth electrical signal paths being closely adjacent to one another to provide capacitive coupling therebetween and with said fifth and seventh electrical signal paths and said sixth and eighth electrical signal paths being closely adjacent to one another to provide capacitive coupling therebetween, the capacitance provided between said first and third electrical signal paths and said second and fourth electrical signal paths being substantially independent of the angular relationship then existing between said first and second portions of said first and second units, the capacitance provided between said fifth and seventh electrical signal paths being variable and having a magnitude dependent upon the angular relationship then existing between said third and fourth portions of said second and third units, and with the capacitance provided between said sixth and eighth electrical signal paths being substantially independent of the angular relationship then existing between said third and fourth portions of said second and third units; and
output means connected with said electrical signal paths of said second and third units through said second electrical signal path on said first unit to receive said AC electrical signals conducted through said electrical signal paths and, responsive to said capacitance between said electrical signal paths, providing an output indicative of a preselected relationship then existing between said second and third units.

17. The device of claim 16 wherein said portions are one of disks and cylinders.

18. The device of claim 16 wherein said mounting means includes a first mount for mounting said first unit on a frame, a second mount for mounting said second unit on a rotatable element, and a third mount for mounting said third unit on a second element that is rotatable with respect to said first and second units.

19. The device of claim 16 wherein said device includes direction sensing means formed in part by additional electrical signal paths provided on said first, second and third units.

20. The device of claim 16 wherein said electrical signal paths of said first, second and third units are configured to provide dual AC signal paths for said AC output signals to ground.

21. A device utilizing capacitive coupling to indicate preselected relationships between units having closely adjacent portions that are angularly displaceable with respect to one another, said device comprising:
a first unit having a portion with a plurality of electrical signal paths thereon;
a second unit having a portion with a first and second plurality of electrical signal paths thereon at each of two different locations, different ones of said first and second plurality of electrical signal paths being electrically connected with one another;
a third unit having a portion with a plurality of electrical signal paths thereon;
signal generating means for providing AC output signals;
signal processing means for receiving said AC output signals from said signal generating means, said signal processing means including dual signal paths each of which includes diode means for providing a positive component on one of said dual signal paths and a negative component on the other of said dual signal paths, and said dual signal paths being connected with said first and second units through said third unit with said AC output signals being conducted through separate paths through said electrical signal paths on said portions of said first and second units;
mounting means for mounting said first, second and third units so that said portions of said first and second units are angularly displacable with respect to one another and with said portion of said third unit being mounted on a frame and having said portions of said first and second units rotatable with respect thereto, said plurality of electrical signal paths of said first unit being closely adjacent to said first plurality of electrical signal paths on said portion of said second unit and said plurality of electrical signal paths on said portion of said third unit being closely adjacent to said second plurality of electrical signal paths on said portion of said second unit to provide capacitive coupling therebetween, with the capacitance provided between said electrical signal path of one of said plurality of electrical signal paths on said portion of said first unit relative to one of said plurality of electrical signal paths on said portion of said second unit being variable and having a magnitude dependent upon the angular relationship then existing between said portions of first and second units, and with the capacitance provided between the remainder of said electrical signal paths being substantially independent of the angular relationship then existing between said portions of said first, second and third units; and
output means connected with said signal processing means to receive said positive and negative components and, responsive to said capacitance between said electrical signal paths, providing an output indicative of angular displacement and the direction of such displacement of one of said first and second units relative to the other of said first and second units.

22. The device of claim 21 wherein said first, second and third units are one of disks and cylinders.

23. The device of claim 21 wherein said first unit is manually rotatable, and wherein said second unit is rotatable with respect to said first and third units.

24. The device of claim 23 wherein said first unit includes a steering wheel, wherein said second unit includes a steering wheel drive shaft, and wherein said third unit is mounted on a frame.

25. The device of claim 21 wherein said portions of said second and third units each have an additional plurality of electrical signal paths thereon, with different ones of said additional electrical signal paths being closely adjacent to establish capacitive coupling therebetween, and with the capacitance between one of said established capacitance coupling providing a capacitance the magnitude of which is dependent upon the angular relationship between said portions of said second and third units whereby an additional output is provided by said output means indicative of the angular positioning of said second unit relative to said third unit.

26. The device of claim 21 wherein said signal generating means includes a square wave oscillator and flip-flop means for providing a square wave output signal to said signal processing means.

27. The device of claim 21 wherein said signal processing means includes an operational amplifier for receiving said positive and negative components on one input and a reference voltage on the other input with said operational amplifier providing an output to said output means.

28. A device utilizing capacitive coupling to indicate angular displacement and positioning between three units having closely adjacent portions that are angularly displacable with respect to one another, said device comprising:
a first unit having a first portion with first and second electrical signal paths thereon;
a second unit having a second portion with third and fourth electrical signal paths thereon at one location and fifth, sixth, seventh and eighth electrical signal paths at a second location;
a third unit having a third portion with ninth, tenth, eleventh and twelfth electrical signal paths thereon;
signal generating means for providing AC output signals to said units with said AC output signals being conducted through said electrical signal paths on said first, second and third portions of said units;
mounting means for mounting said units so that said first, second and third portions of said units are angularly displacable with respect to one another and so that said first and third electrical signal paths, said second and fourth electrical signal paths, said fifth and ninth electrical signal paths, said sixth and tenth electrical signal paths, said seventh and eleventh electrical signal paths and said eighth and twelfth electrical signal paths are closely adjacent to one another to provide capacitive coupling therebetween, with the capacitance provided between said first and third electrical signal paths and said seventh and eleventh electrical signal paths being variable and having a magnitude dependent upon the angular relationship then existing between said first and second portions and said second and third portions of said units, respectively, and with the capacitance provided between the remainder of said closely adjacent electrical signal paths being substantially independent of the angular relationship then existing between said first, second and third portions of said units; and output means connected with said electrical signal paths of said units to receive said AC electrical signals conducted through said electrical signal paths and, responsive to said capacitance between said electrical signal paths, providing outputs indicative of both angular displacement then existing between said first and second units and angular positioning then existing between said second and third units.

29. The device of claim 28 wherein said portions of said first, second and third units are one of disks and cylinders, and wherein said second unit has a plurality of electrical signal paths at each side of said portion of said second unit.

* * * * *